Figure 10:
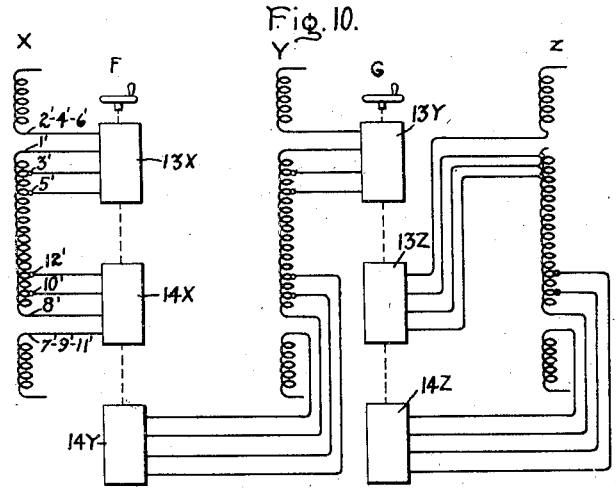

Aug. 19, 1941.    O. H. BEYMER    2,253,165
TAP-CHANGING SYSTEM
Filed March 8, 1940    3 Sheets-Sheet 1
Fig. 1.
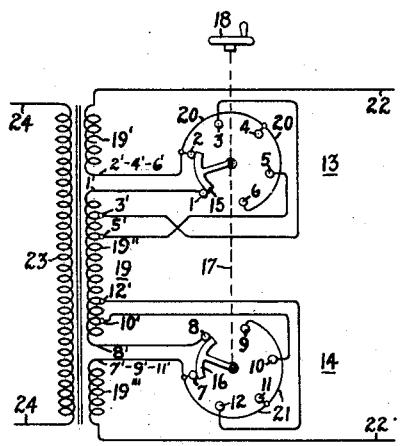
Fig. 2.
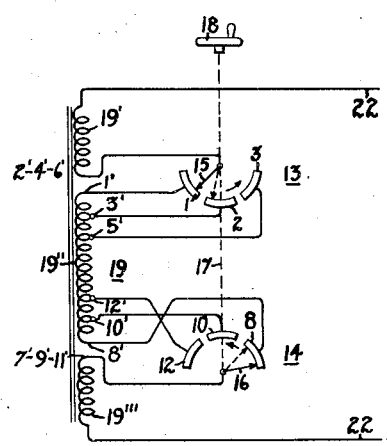
Fig. 3.
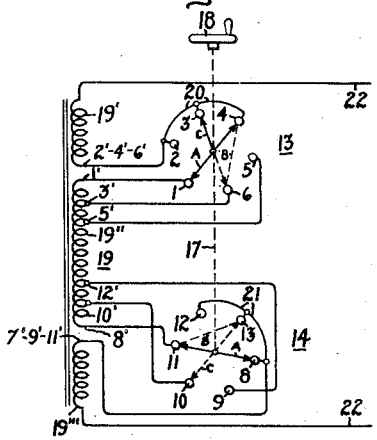
Fig. 4.
| POSITION | RA CONNECTION | |
|---|---|---|
| | RA13 | RA14 |
| A | 1-4 | 8-11 |
| B | 4-6 | 11-13 |
| C | 3-6 | 10-13 |
| D | 3-5 | 10-12 |
| E | 2-5 | 9-12 |
Inventor:
Oliver H. Beymer,
by Harry E. Dunham
His Attorney.

Aug. 19, 1941.  O. H. BEYMER  2,253,165
TAP-CHANGING SYSTEM
Filed March 8, 1940  3 Sheets—Sheet 2
Fig. 5.
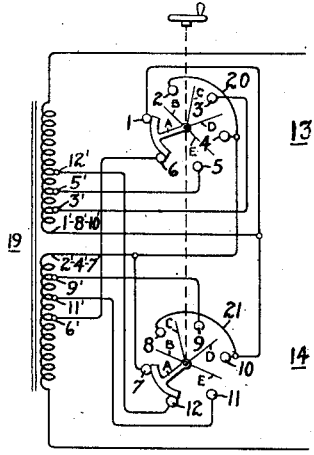
Fig. 6.
| POSITION | R.A. CONNECTION | |
|---|---|---|
| | R.A 13 | R.A. 14 |
| A | 1-6 | 7-12 |
| B | 1-2 | 7-8 |
| C | 2-3 | 8-9 |
| D | 3-4 | 9-10 |
| E | 4-5 | 10-11 |
Fig. 7.  Fig. 8.  Fig. 9.
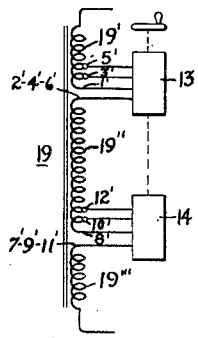 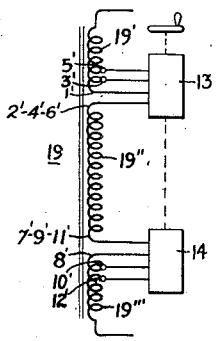 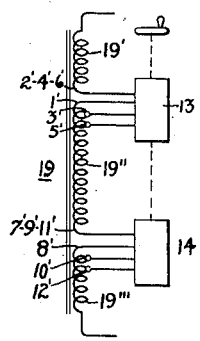
Inventor:
Oliver H. Beymer,
by Harry E. Dunham
His Attorney.

Inventor:
Oliver H. Beymer,
by Harry E. Dunham
His Attorney.

Patented Aug. 19, 1941

2,253,165

UNITED STATES PATENT OFFICE 2,253,165

TAP-CHANGING SYSTEM

Oliver H. Beymer, Pittsfield, Mass., assignor to General Electric Company, a corporation of New York Application March 8, 1940, Serial No. 322,927

10 Claims. (Cl. 171—119)

This invention relates to tap-changing systems and more particularly to improvements in tap-changing systems for varying the ratio of a transformer. The invention is particularly adapted to changing taps when the transformer is not under load but by the addition of conventional auxiliary apparatus, such as arcing contactors, preventive reactors or by-passing impedances, it can readily be used to change taps when the transformer is under load.

The usual maximum range of a transformer tap-changer is in the order of ten per cent. Within this range operation is satisfactory but beyond this range it has been found that such an unbalance is created between the turns of the primary and secondary windings of the transformer that a substantial distortion of the leakage flux takes place. This in turn increases the equivalent series reactance of the transformer and also increases its losses. Both of these results are highly objectionable. However, there are many situations where it is desirable to be able to adjust the transformer ratio throughout a range substantially greater than ten per cent.

In accordance with this invention there is provided a novel, simple and economical arrangement for changing transformer taps over a relatively wide range exceeding ten per cent without substantially adversely affecting the other operating characteristics and properties of the transformer. This result is accomplished by using two ratio adjusting switches of standard construction which are mechanically connected, preferably in tandem, so as to be driven synchronously by the same operating mechanism. In the present preferred forms of the invention the switches are connected respectively to separate sets of taps and these two sets of taps are electrically spaced from each other in the winding and are situated symmetrically with respect to the winding arrangement so that the unbalance between the ampere turns of the transformer windings at all locations thereon will be a minimum throughout the entire range of operation.

An object of the invention is to provide a new and improved transformer tap-changing system.

Another object of the invention is to provide a simple and inexpensive arrangement for changing by means of taps the ratio of a transformer throughout a relatively wide range which is in excess of ten per cent.

The invention will be better understood from the following description taken in connection with the accompanying drawings and its scope will be pointed out in the appended claims.

In the drawings Fig. 1 illustrates diagrammatically a preferred form of the invention applied to a single-phase transformer and using so-called wedge type ratio adjusting switches, Fig. 2 is a modification using dial type ratio adjusting switches, Fig. 3 is a modification using a switch of the type disclosed in Patent 1,535,807 granted April 28, 1925 on an application of Louis F. Blume and assigned to the assignee of the present application, Fig. 4 is a table of the operating positions of Fig. 3, Fig. 5 is a modification in which series-parallel changes are made in the connections between two sections of a transformer winding, Fig. 6 is a table of the various operating positions of and connections obtained by Fig. 5, Figs. 7, 8 and 9 illustrate various modified winding and tap arrangements suitable for use with the switching arrangements of Figs. 1, 2 and 3, Fig. 10 illustrates a three-phase arrangement in which the ratio adjusting switches may be of the type shown in Figs. 1, 2 or 3, and Fig. 11 is a modification of Fig. 10 in which an additional 2:1 variation in ratio may be obtained by a further sectionalization of the windings combined with means selectively connecting them in series or in parallel.

Referring now to the drawings and more particularly to Fig. 1, there is shown therein a set of fixed contacts 1, 2, 3, 4, 5 and 6 and a second set of fixed contacts 7, 8, 9, 10, 11 and 12. These sets are circularly arranged, the first set being the fixed contacts of a ratio adjusting switch 13 and the second set constituting the fixed contacts of a ratio adjusting switch 14. These switches have movable contacts 15 and 16, the movable contact 15 being shown as making a bridging connection between the fixed contacts 1 and 2 of switch 13 and movable contact 16 being shown as making a bridging connection between movable contacts 7 and 8 of switch 14. Both movable contacts are connected to the same operating shaft 17 so as to be operable synchronously by the same operating mechanism, shown for the sake of simplicity merely as a hand wheel 18.

The fixed contacts of switches 13 and 14 are connected to spaced sets of taps in a transformer winding 19 which is divided into sections 19', 19'' and 19'''. Thus, the fixed contacts 1, 3 and 5 are connected to taps 1', 3' and 5' at one end of the section 19'' and the fixed contact 2 is connected to one end of the section 19'. The fixed contacts 4 and 6 are permanently connected to the fixed contact 2 by jumpers 20. Similarly, the fixed contacts 8, 10 and 12 of the switch 14 are connected respectively to taps 8', 10' and 12' located at the other end of the section 19''. The fixed contact 7 is connected to the end of the section 19''' designated 7' and the fixed contacts 9 and 11 are permanently connected to the fixed contact 7 by means of jumpers 21. The other terminals of the sections 19' and 19''' are connected to an external alternating current circuit 22. Another transformer winding 23 is inductively related to the winding 19 and is connected to an external alternating current circuit 24. The windings 19 and 23 may be either interleaved or wound concentrically on the usual core and the relative number of turns of the sections of the winding 19 are such that the inactive end turns of the section 19'' when they are cut out of circuit by the tap changing switches will not produce any substantial unbalance or distortion of the leakage flux in the transformer. For transformer windings of the concentric design the optimum results in this respect are obtained by placing the tapped out portions at the ends of the section 19'' symmetrically at approximately the positions which would allow fifty per cent of the ampere turns of the winding 19 between them. Thus, the two sets of taps are at approximately the one-fourth and three-fourths positions of the ampere turning length of the winding 19. In an interleaved design the optimum result is obtained by taking the taps out in the neutral gap of the two groups of coils and in the groups such that symmetry is maintained in the grouping.

The operation of Fig. 1 is as follows: With the parts in the positions shown in the drawings, all of the turns of the winding 19 are connected in series. If now the operating mechanism 18 rotates the two movable contacts 15 and 16 in a clockwise direction to the next bridging connection the turns between the taps 1' and 3' will be open circuited, the circuit being through section 19', fixed contact 2, movable contact 15, fixed contact 3, tap 3' to tap 8', fixed contact 8, through the movable contact 16 to fixed contact 9, the jumper 21 to the tap 7' and then through the winding section 19'''. In the next bridging position of the switches the portion of the winding 19 between taps 8' and 10' will be open-circuited, the circuit then being through the section 19' to fixed contact 2 and through the jumper 20 to fixed contact 4, through the movable contact 15 to fixed contact 3, then from tap 3' to 10' and from fixed contact 10 through the movable contact 16, to the fixed contact 9 and then through the jumper 21 to the fixed contact 7 and through the winding section 19'''. As the operating mechanism continues to rotate, tapped portions will be removed alternately from the ends of the section 19'' until all of the tapped portions have been removed and the circuit through the section 19'' is completed from tap 5' to tap 12'.

By reversing the operating mechanism the tapped portions at the ends of the section 19' will be alternately reconnected into the circuit.

It will be noted that the arrangement of Fig. 1 is characterized by the alternate removal or insertion of tapped sections while the ratio adjusting switches are both operated synchronously, that is to say, simultaneously at the same speed and also in the same direction. This permits the simplest kind of drive for the two switches as it is possible, as shown in the drawings, to connect them in tandem so that they are both operated from the same drive shaft.

The alternate removal of tapped sections also permits the use of a minimum number of taps. Thus, only half as many taps are necessary as would be required if the same tap range were to be secured in the same number of steps by the simultaneous removal and insertion of tapped sections at two places on the winding 19. From the standpoint of leakage flux distortion it has been found from actual practice that when the percentage turns between taps is relatively small, as is usually the case, the alternate removal or insertion of tapped sections at different locations on the winding is just as efficacious as the simultaneous removal or insertion of equal half-valued tapped sections at similarly located points on the winding.

In Fig. 2 the switches 13 and 14 are of the so-called dial type instead of the so-called wedge type as in Fig. 1. In this type the movable contacts 15 and 16 instead of making a bridging connection between adjacent fixed contacts only engage one fixed contact at a time and a permanent electrical connection is made to each movable contact as by a pigtail or sliding contact. The fixed contacts are no shorter than the spacing between them and the movable contacts are so mounted on the common operating shaft 17 that when one movable contact is moved from engagement with one fixed contact to engagement with the next fixed contact the other movable contact merely moves from one end of the fixed contact it is engaging to the other end thereof. During the next step this operation is reversed so that the first movable contact merely moves from one end to the other of the contact it is in engagement with and the second movable contact moves from one fixed contact to the next.

The operation of Fig. 2 so far as the transformer is concerned is exactly the same as Fig. 1. With the switches in the positions illustrated all of the turns of the winding 19 are in series across the circuit 22. If now the operating mechanism is moved one step in a counterclockwise direction the movable contacts will be moved to the positions shown by the dotted lines. Thus, movable contact 15 of switch 13 moves from fixed contact 1 to fixed contact 2 thereby cutting out the portion of the winding between the taps 1 and 3'. Switch 14 does not produce any tap change because the movable contact 16 does not leave the fixed contact 8. However, in the next position of the operating mechanism movable contact 16 will leave contact 8 and engage contact 10, thus cutting out the section between the taps 8' and 10'. However, movable contact 15 does not leave the fixed contact 2 so that no tap change is produced at the upper end of the winding section 19''. Continued operations of the operating mechanism 18 will then serve to cut out the section between the taps 3' and 5' and between the taps 10' and 12' in succession. Reversal of the operating mechanism will reinsert these tapped sections alternately in reversed order.

In Fig. 3 the movable contacts of the switches are operated by a mechanism of the type described in the above referred to Blume Patent 1,535,807. The details of this mechanism are not shown as they form no part of the present invention. The movable contacts make a bridging connection between two non-adjacent contacts while being out of engagement with the fixed contact therebetween, as is shown in the drawings. In the next position the movable contact pivots around one of the fixed contacts which it is engaging until the free end engages an adjacent fixed contact. In the next position the last engaged fixed contact acts as a pivot and the other end of the movable contact moves until it engages another fixed contact. In this way the movable contacts in effect walk around the fixed contacts with alternate ends of the movable contacts acting as pivot points. Three of the fixed contacts of switch 13 are permanently connected by the jumpers 20 and three of the fixed contacts of the switch 14 are permanently connected by the jumpers 21.

The sequence of operation of Fig. 3 is set forth in the table shown in Fig. 4 in which position A is the full line position illustrated in the drawing and positions B, C, D and E are the successive positions of the movable contacts when the operating mechanism is operated in one direction. Positions B and C are also shown in the drawing by the correspondingly labeled dashed lines. The other two columns of the table show the ratio adjuster connections made between the fixed contacts of each ratio adjusting switch by their movable contacts in the various positions of the operating mechanisms. The resulting tap-changing operation is the same as in Figs. 1 and 2.

In Fig. 5 the winding 19 whose effective number of series turns is varied is divided into but two sections whose adjacent ends are provided with an equal number of equally spaced taps. These taps are connected to the fixed contacts of switches 13 and 14 which are shown by way of example as switches of the so-called wedge type as in Fig. 1. However, only fixed contacts 2 and 4 of switch 13 are permanently connected by jumper 20 and in switch 14 only the fixed contacts 8 and 10 are permanently connected by jumper 21.

The operation of Fig. 5 will be clear from the table shown in Fig. 6. In this table position A will be seen to correspond to the illustrated position and in this position the connections are such that the tapped portions of the two sections of the winding are connected in parallel with each other. The untapped portions of the winding sections are, therefore, in series with each other through two parallel branches, each of which contains the tapped portion of one of the sections. This gives the minimum number of effective series turns of the winding as a whole. In position B the winding sections are connected directly in series, that is to say, the untapped and tapped portions of both windings are connected in series thus giving the maximum number of effective series turns. Positions C and D produce the same tap-changing connections and connect the portion of upper winding section between taps 1 and 3 in parallel with the portion of the lower winding section between taps 2 and 9 while in position E an additional tapped section is added to each parallel branch. In this manner the effective turns of the winding as a whole are varied while at the same time all of the turns are always in circuit and carrying some current so that even over a wide change of effective number of series turns the balance between the transformer windings is not seriously affected.

In Figs. 1, 2 and 3 the ends of the intermediate section 19'' are tapped. This, however, is not essential and as shown in Figs. 7, 8 and 9 substantially the same results can be obtained by various other tapped arrangements of the winding sections. Thus, in Fig. 7 only one end of the intermediate section 19'' is provided with taps, the other tapped portion being the inner end of the first section 19'. In Fig. 8 the inner ends of the two end sections 19' and 19''' are provided with taps and only the terminals of the intermediate section 19' are brought out. In Fig. 9 the arrangement is in effect the reverse of Fig. 7 in that the inner end of the lower section 19''' is provided with taps and only the upper end of the intermediate section 19'' is provided with taps. The ratio adjusting switches of either Fig. 1, 2 or 3 may be used with the tap circuits shown in Figs. 5, 7, 8 and 9.

In Fig. 10 there is shown a three-phase transformer winding using the tap-changing system of either Figs. 1, 2 or 3. This is characterized by having only two operating mechanisms F and G instead of the usual three, each of the operating mechanisms serving to drive three ratio adjusting switches. Thus, operating mechanism F not only drives switches 13x and 14x for phase X but also drives switch 14y for phase Y and operating mechanism G not only drives switches 13z and 14z for phase Z but also drives switch 13y for phase Y. This results in a very compact, balanced and economical arrangement for changing taps over a wide range on a three phase transformer.

Figure 11:
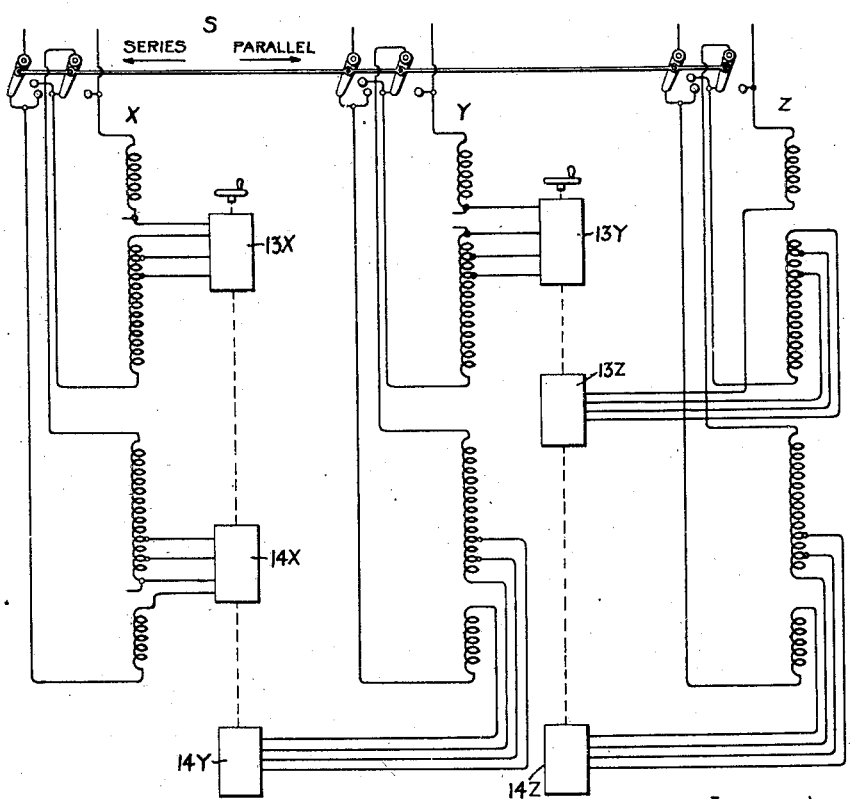

Fig. 11 differs from Fig. 10 in that each of the phase windings X, Y and Z is opened at the middle and the terminals thereof are led to a gang series-parallel switch S so that the range of ratios may be doubled, that is to say, a 2:1 change in ratio will be obtained by changing the connections of the two halves of the phase windings from series to multiple or vice versa.

For the series connection the operation is the same as for Fig. 10. However, for the parallel connection it is necessary to skip every other position of the operating mechanisms in order to maintain equality between the number of active turns connected in parallel. Thus, the ratio adjusting switches produce only two tap-changing steps during the parallel connection while they produce four tap-changing steps alternately in the two equal halves of each phase winding for the series connection thereof. Of course, this number can be increased by increasing the number of taps and switch contacts.

While I have shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. Apparatus for changing taps over a wide range on one of two closely inductively related transformer windings in such a manner as to produce a minimum distortion of the leakage flux between said two windings as a result of said tap changing, comprising, in combination, a pair of tap-charging switches each having a plurality of relatively fixed contacts and each having a single relatively movable contact for engaging said fixed contacts in a predetermined sequence, said transformer winding having a break between normally serially-connected sections thereof and associated with each one of said switches, a connection between at least one of the contacts of one of said switches and a terminal of one of said winding sections in permanent series-circuit relationship with said transformer winding, individual connections between a plurality of the relatively fixed contacts of said switch and taps on another of said winding sections, a connection between at least one of the contacts of the other of said switches and another terminal of one of said winding sections in permanent series-circuit relationship with said transformer winding, individual connections between a plurality of the fixed contacts of said other switch and taps of another of said winding sections, and a common operating mechanism for driving simultaneously the movable contacts of both of said switches.

2. Apparatus for changing taps over a wide range on one of two closely inductively related transformer windings in such a manner as to produce a minimum distortion of the leakage flux between said two windings as a result of said tap changing, comprising, in combination, a pair of tap-changing switches each having a plurality of fixed contacts and each having a movable contact for making successive bridging connections between different pairs of fixed contacts, said transformer winding having a break between normally serially-connected sections associated with each of said switches, permanent connections between a plurality of fixed contacts of one switch and a terminal of one of said winding sections, individual connections between the remaining fixed contacts of said switch and taps on another of said winding sections, permanent connections between a plurality of fixed contacts of the other of said switches and another terminal of one of said winding sections, individual connections between the remaining fixed contacts of said other switch and taps on another of said winding sections, and a common operating mechanism for driving simultaneously the movable contacts of both switches.

3. In combination, a transformer whose primary and secondary windings are closely coupled when each is considered as a whole, and means for changing the active turns of one of said windings alternately at at least two serially-connected places thereon which are so located with respect to its ends and the rest of the transformer that such changes produce a minimum distortion of the leakage flux of said transformer, said places being further characterized by being separated from the ends and the middle of said winding by fixed numbers of turns of said winding which are always in circuit, said means comprising separate sets of taps brought out from said winding at said places, two tap-changing switches connected respectively to said sets of taps, and means including a common operating mechanism for driving said switches simultaneously so that tapped sections of said winding are removed from said winding alternately at said places when said mechanism is operated in one direction and are inserted in said winding alternately at said places when said operating mechanism is operated in the other direction.

4. In combination, a transformer whose primary and secondary windings are closely coupled when each is considered as a whole, and means for changing the active turns of one of its windings alternately at at least two serially-connected places thereon which are so located with respect to its ends and the rest of the transformer that such changes produce a minimum distortion of the leakage flux of said transformer, said places being further characterized by being separated from the ends and the middle of said winding by fixed number of turns of said winding which are always in circuit, said means comprising separate sets of taps brought out from said winding at said places, two tap-changing switches connected respectively to said sets of taps, and means including a common operating mechanism for driving said switches synchronously, said switches acting to remove tapped sections of said winding alternately at said places when driven in one direction and acting to insert tapped sections of said winding alternately at said places when driven in the opposite direction.

5. In combination, first and second transformer tap-changing switches, each of said switches having a plurality of fixed contacts and a movable contact for successively interconnecting different pairs of adjacent fixed contacts, a common operating mechanism for driving both of said movable contacts, both of said movable contacts when driven by said operating mechanism acting to interconnect pairs of their associated fixed contacts substantially simultaneously and to break said interconnections substantially simultaneously, permanent interconnections between those of the fixed contacts of the first switch which are engaged by the leading side of its movable contact in every alternate interconnecting position thereof when it is driven in a given direction, permanent interconnections between those of the fixed contacts of the second switch which are engaged by the trailing side of its movable contact when it is in alternate positions coincidental with said alternate positions of the first switch, a transformer winding having two sets of taps at two different places thereon, the taps of one set being connected respectively to the remaining fixed contacts of the first switch, the taps of the remaining set being connected respectively to the remaining fixed contacts of the second switch, and connections to the sets of permanently interconnected fixed contacts of each switch respectively for establishing a series circuit through said switches and winding.

6. In combination, a transformer winding having three serially-connected sections, two of said sections being end sections each having an outer terminal constituting one of the terminals of said winding and each having an inner terminal, the third section being an intermediate section whose turns at each end are provided with a plurality of taps for connection respectively to the inner terminal of the adjacent end section, duplicate tap-changing switches each comprising a plurality of relatively fixed contacts arranged in a circle between adjacent pairs of which connection is successively made and broken by a rotatable contact, each of said circularly arranged contacts being a common contact of adjacent pairs thereof, a common operating mechanism for rotating both of said rotatable contacts at the same speed so that contact is simultaneously made and broken between adjacent pairs of fixed contacts in both switches, a connection between the inner terminal of one of said end sections and the fixed contact of one of said switches which is in engagement with the leading side of the movable contact of said switch when said movable contact is making connection between said fixed contact and an adjacent fixed contact and is rotating in a given direction, connections between said leading-side-engaging fixed contact and every alternate fixed contact of said switch, connections between the remaining fixed contacts of said switch and the taps at one end of said intermediate winding section, a connection between the inner terminal of the other end winding section and the fixed contact of the other switch which is in engagement with the trailing side of its movable contact at the time that the leading-side-engaging fixed contact of the first switch is engaged by its movable contact, connections between said trailing-side-engaging fixed contact and every alternate fixed contact of its switch, and connections between the remaining fixed contacts of said other switch and the taps at the other end of said intermediate winding section.

7. Apparatus for changing taps over a wide range on one of two inductively related transformer windings in such a manner as to produce a minimum distortion of the leakage flux of the transformer as a result of said tap changing, comprising, in combination, a pair of tap-changing switches each having a plurality of fixed contacts and each having a movable contact for successively engaging said fixed contacts one at a time, said transformer winding having a break associated with each of said switches between two serially-connected sections thereof, a permanent connection between the movable contact of one of said switches and a terminal of one of said winding sections, individual connections between the fixed contacts of said switch and taps on another of said winding sections, a permanent connection between the movable contact of the other of said switches and another terminal of one of said winding sections, individual connections between the fixed contacts of said other switch and taps on another of said winding sections, and a common operating mechanism for driving simultaneously the movable contacts for both switches in such a manner that when the movable contact of one switch goes from one fixed contact to the next the movable contact of the other switch moves from one end to the other of the fixed contact it is in engagement with and when said other movable contact moves from one fixed contact to the other the first movable contact moves from one end to the other of the fixed contact it is in engagement with.

8. In a tap-changing system for a transformer having a winding divided into two sections each of which is provided with a similar set of taps, means for connecting variable portions of said sections in series through parallel connections each containing the remaining portions of said sections respectively comprising a pair of multi-position switches each of which interconnects said sections by way of said taps, and common operating means for driving said switches so that said interconnections are completed by way of corresponding taps on said two sections.

9. In a tap-changing system for a three-phase transformer having three corresponding phase windings, two spaced sets of taps brought out from each of said windings, the spacings between taps of each set being relatively small compared with the spacing between said sets of taps, six tap-changing switches connected respectively to said sets of taps, two operating mechanisms for driving respectively the two switches which are connected to the sets of taps of one of said phase windings, one of said operating mechanisms being connected to operate also the two tap-changing switches which are connected to the sets of taps in another of said windings, and the other of said operating mechanisms being connected to operate the two tap-changing switches which are connected to the sets of taps in the remaining phase winding.

10. In a tap-changing system for a three-phase transformer having three similar phase windings each of which is divided in half, switching means for selectively connecting the halves of each of said phase windings in series and in parallel, separate sets of taps located in each of the halves of said windings, separate tap-changing switches connected to each of said sets of taps, and means for operating said switches when the halves of said windings are connected in series and when they are connected in multiple.

OLIVER H. BEYMER.